(12) United States Patent
Jung

(10) Patent No.: US 7,785,222 B2
(45) Date of Patent: Aug. 31, 2010

(54) DIFFERENTIAL GEAR SET IN WHICH LUBRICATION STRUCTURE IS IMPROVED

(75) Inventor: Jae-Hun Jung, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 363 days.

(21) Appl. No.: 12/062,726

(22) Filed: Apr. 4, 2008

(65) Prior Publication Data

US 2009/0143183 A1      Jun. 4, 2009

(30) Foreign Application Priority Data

Dec. 4, 2007      (KR)      .................... 10-2007-0124929

(51) Int. Cl.
*F16H 57/04*      (2010.01)
(52) U.S. Cl. .................................... 475/160
(58) Field of Classification Search ............ None
See application file for complete search history.

(56) References Cited

U.S. PATENT DOCUMENTS 5,823,908 A * 10/1998 Stefanek ................ 475/230
6,689,009 B1 * 2/2004 Fett ........................ 475/230
6,699,154 B2 * 3/2004 Orr et al. ................ 475/230

FOREIGN PATENT DOCUMENTS

| JP | 1-96554 U | 6/1989 |
| JP | 5-96592 U | 12/1993 |

* cited by examiner

*Primary Examiner*—Dirk Wright
(74) *Attorney, Agent, or Firm*—Morgan, Lewis & Bockius LLP

(57) ABSTRACT

A differential gear set includes a pinion gear that at least a groove having a inner planar surface, at least a gear is formed in an exterior circumference thereof and at least a pinion shaft in which an end portion is inserted into the groove such that an end surface faces the inner surface of the groove and a planar portion is formed by cutting off in one side of an exterior circumference thereof corresponding to the interior circumference of the groove.

17 Claims, 3 Drawing Sheets

DIFFERENTIAL GEAR SET IN WHICH LUBRICATION STRUCTURE IS IMPROVED

CROSS-REFERENCE TO RELATED APPLICATION

This application claims priority to and the benefit of Korean Patent Application No. 10-2007-0124929 filed in the Korean Intellectual Property Office on Dec. 4, 2007, the entire contents of which are incorporated herein by reference.

BACKGROUND OF THE INVENTION (a) Field of the Invention

The present invention relates to a differential gear set, more particularly, the differential gear set in which a lubrication structure thereof is improved, so durability and safety are enhanced.

(b) Description of the Related Art

Generally, a differential apparatus transfers power of an engine from a drive shaft to a driving axle.

The differential apparatus prevents slipping of a wheel when a vehicle turns.

Typical differential gear includes a pinion gear, a side gear, a ring gear, and a case. The pinion gear is coupled to the side gear that is splined to a rear axle shaft.

FIG. 1 is a partial cross-sectional view of a general differential gear set.

As shown in FIG. 1, the differential gear set includes a housing 100, a pinion shaft 105, a pinion gear 110, a side gear 115, and an axle shaft 120.

However, lubrication efficiency can be decreased between an interior circumference of the pinion gear 110 and an exterior circumference of the pinion shaft 105 when the pinion gear 110 rotates on the pinion shaft 105. Further, there is a problem that the elements 105 and 110 stick to each other in a particular case.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a differential gear set having advantages of improving a lubrication structure such that a pinion gear rotates well on a pinion shaft, and such that durability thereof is enhanced and friction is decreased.

A differential gear set in which a lubrication structure is improved may include: at least a pinion gear including a groove that is formed on at least one side of the pinion gear and has an inner planar bottom surface and a circular interior circumference formed substantially on a rotation shaft, wherein a gear is formed at an exterior circumference of the pinion gear; and at least a pinion shaft in which at least an end portion is inserted into the groove such that a bottom surface of end portion of the pinion shaft faces the inner planar bottom surface of the groove and at least a planar portion is formed at the end portion by cutting off at least one side of an exterior circumference thereof.

Further, at least an oil hole may be formed across from the planar portion to an opposite outside surface thereof at least at the end portion of the pinion shaft and two planar portions may be formed at respective sides of the pinion shaft.

A center portion of the bottom surface of the pinion shaft may contact the inner planar bottom surface of the groove and an edge portion of the pinion shaft has a gap from a inner planar bottom surface of the groove. The gap from the inner planar bottom surface of the groove to the bottom surface of the pinion shaft become increased from a center portion of a rotation shaft toward an edge of an exterior circumference direction thereof.

The groove that has a circular shape substantially on a center of a rotation shaft of the pinion gear may be formed at both sides of the pinion gear, and pinion shafts are inserted into the two grooves.

An arc-shaped space may be formed between the planar portion and an interior circumference of the groove.

As an another exemplary embodiment of the present invention, the differential gear set in which a lubrication structure is improved, may comprise: a first pinion gear including a first groove formed at upper portion thereof and a second groove formed at lower portion thereof; a second pinion gear including a third groove at upper portion thereof; a first pinion shaft wherein one portion of the first pinion shaft is coupled to a housing and lower portion of the first pinion gear is inserted into the first groove of the first pinion gear and a first space is formed between the lower portion of the first pinion shaft and the first groove; and a second pinion shaft wherein upper portion of the second pinion shaft is inserted into the second groove of the first pinion gear and forms a second space between the upper portion of the second pinion shaft and the second groove, and wherein lower portion of the second pinion shaft is inserted into the third groove of the second pinion gear and forms a third space between the lower portion of the second pinion shaft and the third groove.

Further the upper portion and/or lower portion of the second pinion shaft may be formed of at least a planar portion in the longitudinal direction of the second pinion shaft and at least a fourth space is formed between interior circumference of the second and/or third groove and an exterior circumference of the second pinion shaft.

The first, second and third grooves may have inner planar bottom surfaces and a center portion of the lower portion of the first pinion shaft is placed on the inner planar bottom surface of the first groove, a center portion of the upper portion of the second pinion shaft is placed on the inner planar bottom surface of the second groove, and a center portion of the lower portion of the second pinion shaft is placed on the inner planar bottom surface of the third groove.

At least an oil hole may be formed between the planar portions therethrough.

An oil hole formed at upper portion of the second pinion shaft may be positioned in the second groove.

An oil hole formed at lower portion of the second pinion shaft may be positioned in the third groove.

A gap between the inner planar bottom surface of the first groove and the lower end surface of the first pinion shaft become larger from the center portion toward an edge of an exterior circumference direction thereof.

A gap between the inner planar upper surface of the second groove and the upper end surface of the second pinion shaft become larger from the center portion toward an edge of an exterior circumference direction thereof.

A gap between the inner planar bottom surface of the second groove and the lower end surface of the second pinion shaft become larger from the center portion toward an edge of an exterior circumference direction thereof.

The first pinion shaft, the second pinion shaft, the first pinion gear and the second pinion gear may be aligned coaxially.

Accordingly, from this configuration, the oil hole through which oil flows is formed in the pinion shaft, so lubrication efficiency is improved in a section at which the pinion gear and the pinion shaft slides.

In addition, the pinion shaft is inserted into the groove that is formed on the pinion gear and a contact area between the end surface of the pinion shaft and the inner surface of the groove is minimized, so friction/abrasion is reduced and lubrication efficiency is enhanced.

Further, the space is formed between the end surface of the pinion shaft and the inner surface of the groove that is formed in the pinion gear, so lubrication efficiency is improved.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF REFERENCE NUMERALS INDICATING PRIMARY ELEMENTS IN THE DRAWINGS

Figure 1:
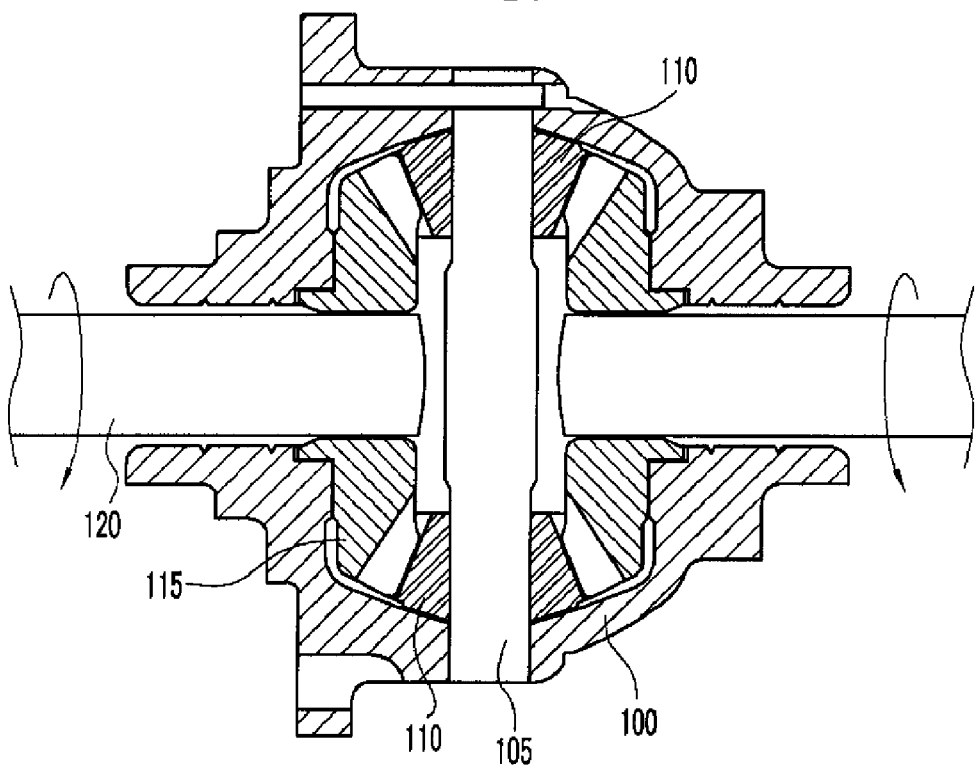
FIG. 1 is a partial cross-sectional view of a general differential gear set.

| | | |
|---|---|---|
| 200: housing | | |
| 205a: first pinion shaft | 205b: second pinion shaft | |
| 210a: first pinion gear | 210b: second pinion gear | |
| 215: side gear | 220: axle shaft | |
| 300a: first space | 300b: second space | 300c: third space |
| 305a: first groove | 305b: second groove | 305c: third groove |
| 310: rotation shaft | | |
| 400, 415: planar portion | | |
| 401: first oil hole, | 405: second oil hole | |
| 410: third space | 505: inner bottom surface | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

A differential gear set is explained in the following according to an exemplary embodiment of the present invention, referring to the accompanying drawings.

Figure 2:
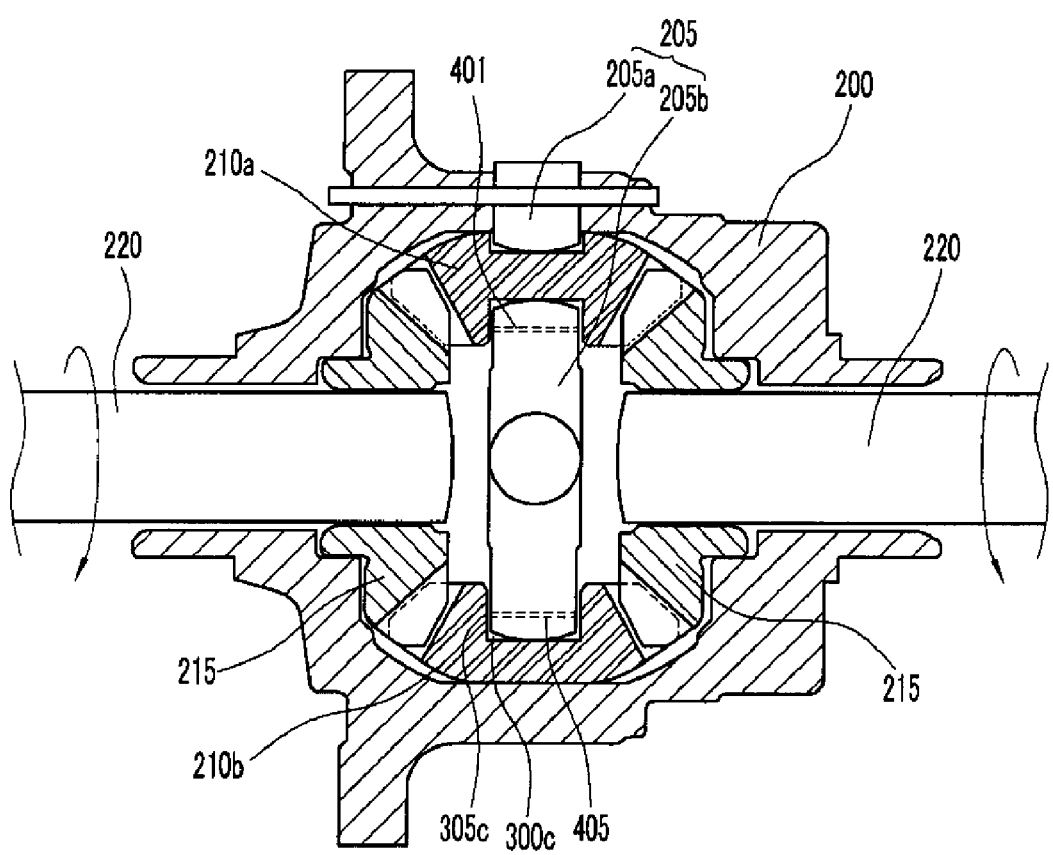
FIG. 2 is a partial cross-sectional view of a differential gear set according to an exemplary embodiment of the present invention.

FIG. 2 is a partial cross-sectional view of a differential gear set according to an exemplary embodiment of the present invention.

Figure 3:
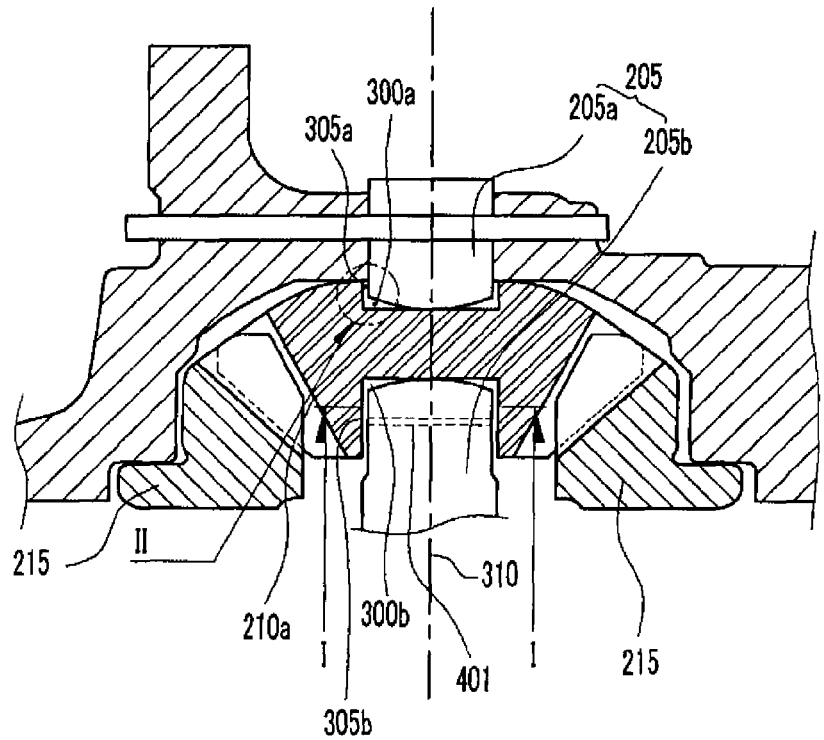
FIG. 3 is a partial detailed cross-sectional view of a differential gear set according to an exemplary embodiment of the present invention.

As shown in FIGS. 2 and 3, a differential gear set includes a housing 200, a ring gear (not shown), a pinion shaft 205, first and second pinion gears 210a and 210b, side gears 215, and axle shafts 220.

The ring gear is disposed outside the housing 200. The ring gear is rotated by a pinion gear that is formed in an end portion of a drive shaft (not shown). Accordingly, the ring gear and the housing 200 rotate.

Axle shafts 220 are inserted into the right and left sides of the housing 200 respectively in the drawing, and the side gears 215 are splined to distal end portions of the axle shafts 220. Each side gear 215 of the axle shaft 220 is coupled to the first and second pinion gears 210a and 210b.

Pinion shaft 205 is configured to support the first pinion gear 210a and the second pinion gear 210b. The pinion shaft 205 includes a first pinion shaft 205a and a second pinion shaft 205b in the present exemplary embodiment.

Upper portion of the first pinion shaft 205a is coupled to the housing 200. Lower portion of the first pinion shaft 205a and upper portion of the second pinion shaft 205b supports the first pinion gear 210a downwards and upwards respectively.

A first groove 305a is formed in upper side of the first pinion gear 210a and a second groove 305b is formed on lower side of the first pinion gear 210a along a rotation center of a rotation shaft 310 for the pinion shaft 205.

The lower portion of the first pinion shaft 205a is complimentarily inserted into the first groove 305a and the upper portion of the second pinion shaft 205b is complimentarily inserted into the second groove 305b.

Also, third grooves 305c is formed in upper side of the second pinion gear 210b along a rotation center of a rotation shaft 310 for the pinion shaft 205, and a lower portion of the second pinion shaft 205b is complimentarily inserted into the third groove 305c.

Coupling structures of the first pinion gear 210a and the first pinion shaft 205a and the second pinion shaft 205b are explained in detail referring to FIG. 3.

FIG. 3 is a partial detailed cross-sectional view of a differential gear set according to an exemplary embodiment of the present invention.

As shown in FIG. 3, the first pinion gear 210a is externally meshed with the side gear 215 and rotates with respect to the rotation center of rotation shaft 310.

The first groove 305a is formed on upper side of the first pinion gear 210a and the second groove 305b is formed on lower side thereof. A lower portion of the first pinion shaft 205a is inserted into the first groove 305a complimentarily and an upper portion of the second pinion shaft 205b is inserted into the second groove 305b complimentarily.

The first groove 305a and the second groove 305b have a circular interior circumference, and the first and second pinion shafts 205a and 205b are inserted complimentarily thereto. Further, inner bottom surfaces of the first groove 305a and the second groove 305b are planar.

A lower portion of the second pinion shaft 205b is inserted into the third groove 305c complimentarily as shown in FIG. 2, and a lower end surface of the second pinion shaft 205b contacts on an inner bottom surface of the third groove 305c.

Particularly, there is a characteristic shape of an end surface of the first pinion shaft 205a in the present exemplary embodiment as explained hereinafter, referring to FIG. 3.

A center portion in the lower end surface of the first pinion shaft 205a contacts onto an inner bottom surface of the first groove 305a. From this configuration, the first pinion shaft 205a and the first pinion gear 210a may be coaxially aligned.

Further, a distance between the inner bottom surface of the first groove 305a and the lower surface of the first pinion shaft 205a become increased toward an inner circumference of first groove 305a from the rotation shaft 310 of the first pinion shaft 205a radially.

From this configuration, a first space 300a is formed between the lower end surface of the first pinion shaft 205a and the inner bottom surface of the first groove 305a, and thus lubricant is interposed in the first space 300a. Accordingly, lubrication efficiency is improved when the first pinion gear 210a rotates between the first pinion shaft 205a and the second pinion shaft 205b about the rotation shaft 310.

The center portion in the upper end surface of the second pinion shaft 205b contacts onto the inner upper surface of the second groove 305b, and the gap between the upper end surface of the second pinion shaft 205b and the inner upper surface of the second groove 305b become increased toward an inner circumference of second groove 305b from the center line of the second pinion shaft 205b radially.

Accordingly, a second space 300b is formed between the upper end surface of the second pinion shaft 205b and the inner upper surface of the second groove 305b, and thus lubricant is interposed in the second space 300b. Accordingly, lubrication efficiency is improved when the first pinion gear 210a rotates on the second pinion shaft 205b.

Further, in an exemplary embodiment of the present invention, a third space 300c is formed between the lower end surface of the second pinion shaft 205b and the inner lower surface of the third groove 305c, and thus lubricant is interposed in the third space 300c. Accordingly, lubrication efficiency is improved when the second pinion gear 210b rotates on the second pinion shaft 205b.

Particularly, the pinion shaft 205 does not penetrate the first and second pinion gears 210a and 210b in an exemplary embodiment of the present invention. Generally, in a case in which the pinion shaft penetrates, lubricant can pass through a penetration hole, but a penetration hole is not formed in the present exemplary embodiment.

Referring to FIG. 2 again, when the first and second pinion gears 210a and 210b and the pinion shaft 205 rotate on a rotation center line of the axle shaft 220, lubricant placed in the second groove 305b and the third groove 305c cannot move to an inner surface of the housing 200 through the first and second pinion gear 210a and 210b.

In contrast, since the pinion shaft 105 of general differential gear set completely penetrates the pinion gears 110, lubricant that is interposed between the pinion gears 110 and the pinion shaft 105 may flow to the inner side of the housing, so lubrication efficiency can be decreased.

However, since the pinion shaft 205 does not penetrate the first and second pinion gears 210a and 210b in an exemplary embodiment of the present invention, the problems stated above are improved.

Figure 4:
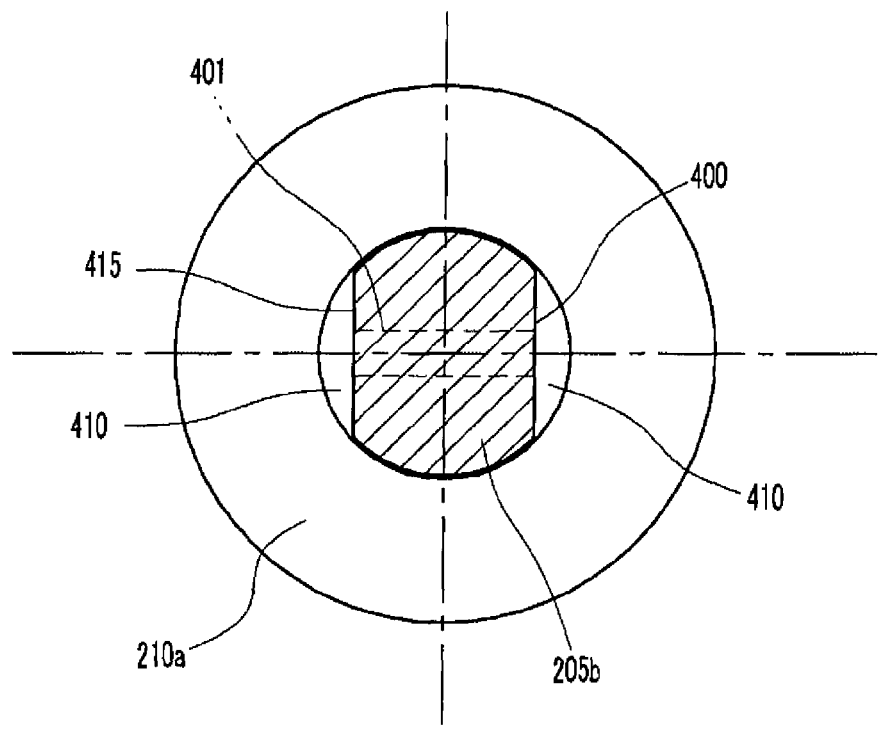
FIG. 4 is a cross-sectional top view according to an I-I line of FIG. 3.

FIG. 4 is a cross-sectional view according to I-I line of FIG. 3.

As shown in FIG. 4, a lower side of the first pinion gear 210a is provided to receive an exterior circumference of an upper portion of a second pinion shaft 205b. Planar portions 400 and 415 are formed at both lateral sides of an exterior circumference of the second pinion shaft 205b. The planar portions 400 and 415 can be formed by grinding/cutting the exterior circumference of the second pinion shaft 205b.

A third space 410 is formed between the interior circumference of the first pinion gear 210a and the planar portions 400 and 415 of the second pinion shaft 205b, and lubricant is interposed in the third space 410.

Accordingly, a lubrication film can be formed easily between the interior circumference of the first pinion gear 210a and the exterior circumference of the second pinion shaft 205b.

As shown in FIG. 4, an oil hole 405 is formed across end portion of the second pinion shaft 205b.

The oil hole 405 is penetrated between the planar portions 400 and 415 that are formed on the second pinion shaft 205b.

Figure 5:
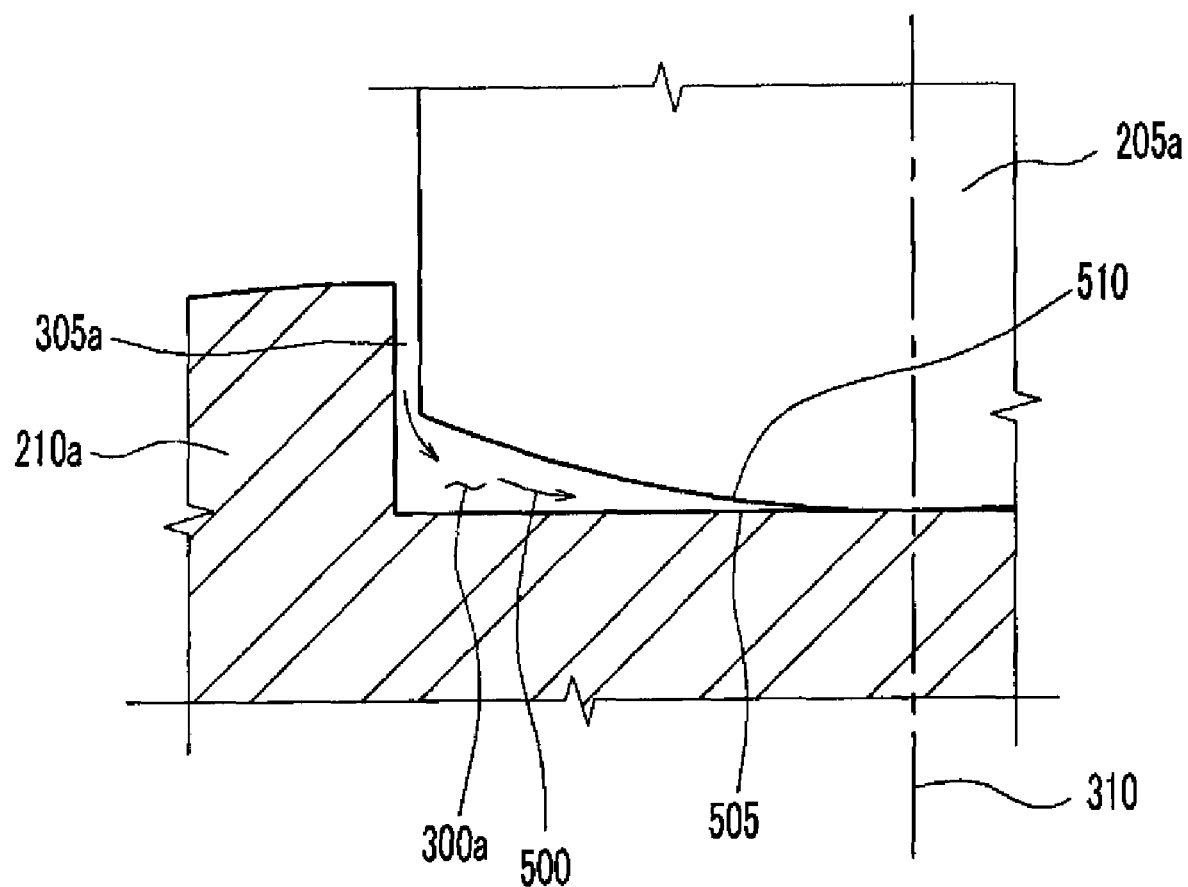
FIG. 5 is a detailed cross-sectional front view of a section II of FIG. 3.

FIG. 5 is a detailed cross-sectional view of a section II of FIG. 3.

As shown in FIG. 5, the first groove 305a is formed in an upper portion of the first pinion gear 210a, and a lower portion of the first pinion shaft 205a is inserted into the first groove 305a.

Lower portion of the first pinion shaft 205a is rotatably disposed in the first groove 305a. Further, a portion of the lower end surface of the first pinion shaft 205a contacts the inner bottom surface 505 of the first groove 305a on the a rotation shaft 310 and an edge portion of the first pinion shaft 205a has a gap from the inner bottom surface 505 of the first groove 305a.

Particularly, a distance between the lower end surface 510 of the first pinion shaft 205a and the inner bottom surface 505 of the first groove 305a becomes larger further from the rotation shaft 310 of the first pinion shaft 205a to the exterior circumference direction radially. As described above, the inner bottom surface 505 of the first groove 305a is planar.

Accordingly, a first space 300a is formed between the lower end surface 510 of the first pinion shaft 205a and the inner bottom surface 505 of the first groove 305a, so lubricant is easily interposed in the first space 300a.

Explaining with regard to elastic fluid lubrication, when the rotation bodies 205a and 210a rotate, a lubricant 500 therearound comes together, and density and viscosity of the lubricant that is compressed in a narrow space is increased. The lubricant 500 of which a viscosity thereof is increased has a semisolid state, and functions as a wedge that separates the rotation bodies 205a and 210a.

Lubrication efficiency is improved in the present exemplary embodiment by making a structure in which the lubricant functions as a wedge between the first pinion shaft 205a and the first pinion gear 210a.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A differential gear set in which a lubrication structure is improved, comprising:
    at least a pinion gear including a groove that is formed on at least one side of the pinion gear and has an inner planar bottom surface and a circular interior circumference formed substantially on a rotation shaft, wherein a gear is formed at an exterior circumference of the pinion gear; and
    at least a pinion shaft in which at least an end portion is inserted into the groove such that a bottom surface of end portion of the pinion shaft faces the inner planar bottom surface of the groove and at least a planar portion is formed at the end portion by cutting off at least one side of an exterior circumference thereof.

2. The differential gear set in which a lubrication structure is improved of claim 1, wherein at least an oil hole is formed across from the planar portion to an opposite outside surface thereof at least at the end portion of the pinion shaft.

3. The differential gear set in which a lubrication structure is improved of claim 1, wherein two planar portions are formed at respective sides of the pinion shaft.

4. The differential gear set in which a lubrication structure is improved of claim 1, wherein a center portion of the bottom surface of the pinion shaft contacts the inner planar bottom surface of the groove and an edge portion of the pinion shaft has a gap from a inner planar bottom surface of the groove.

5. The differential gear set in which a lubrication structure is improved of claim 4, wherein the gap from the inner planar bottom surface of the groove to the bottom surface of the pinion shaft become increased from a center portion of a rotation shaft toward an edge of an exterior circumference direction thereof.

6. The differential gear set in which a lubrication structure is improved of claim 1, wherein the groove that has a circular shape substantially on a center of a rotation shaft of the pinion gear is formed at both sides of the pinion gear, and pinion shafts are inserted into the two grooves.

7. The differential gear set in which a lubrication structure is improved of claim 1, wherein an arc-shaped space is formed between the planar portion and an interior circumference of the groove.

8. A differential gear set in which a lubrication structure is improved, comprising:
    a first pinion gear including a first groove formed at upper portion thereof and a second groove formed at lower portion thereof;
    a second pinion gear including a third groove at upper portion thereof;
    a first pinion shaft wherein one portion of the first pinion shaft is coupled to a housing and lower portion of the first pinion gear is inserted into the first groove of the first pinion gear and a first space is formed between the lower portion of the first pinion shaft and the first groove; and
    a second pinion shaft wherein upper portion of the second pinion shaft is inserted into the second groove of the first pinion gear and forms a second space between the upper portion of the second pinion shaft and the second groove, and wherein lower portion of the second pinion shaft is inserted into the third groove of the second pinion gear and forms a third space between the lower portion of the second pinion shaft and the third groove.

9. The differential gear set in which a lubrication structure is improved of claim 8, wherein the upper portion and/or lower portion of the second pinion shaft is formed of at least a planar portion in the longitudinal direction of the second pinion shaft and at least a fourth space is formed between interior circumference of the second and/or third groove and an exterior circumference of the second pinion shaft.

10. The differential gear set in which a lubrication structure is improved of claim 9, wherein the first, second and third grooves have inner planar bottom surfaces and a center portion of the lower portion of the first pinion shaft is placed on the inner planar bottom surface of the first groove, a center portion of the upper portion of the second pinion shaft is placed on the inner planar bottom surface of the second groove, and a center portion of the lower portion of the second pinion shaft is placed on the inner planar bottom surface of the third groove.

11. The differential gear set in which a lubrication structure is improved of claim 10, wherein at least an oil hole is formed between the planar portions therethrough.

12. The differential gear set in which a lubrication structure is improved of claim 11, wherein an oil hole formed at upper portion of the second pinion shaft is positioned in the second groove.

13. The differential gear set in which a lubrication structure is improved of claim 11, wherein an oil hole formed at lower portion of the second pinion shaft is positioned in the third groove.

14. The differential gear set in which a lubrication structure is improved of claim 10, wherein a gap between the inner planar bottom surface of the first groove and the lower end surface of the first pinion shaft become larger from the center portion of the lower portion of the first pinion shaft toward an edge of an exterior circumference direction thereof.

15. The differential gear set in which a lubrication structure is improved of claim 10, wherein a gap between the inner planar upper surface of the second groove and the upper end surface of the second pinion shaft become larger from the center portion of the upper portion of the second pinion shaft toward an edge of an exterior circumference direction thereof.

16. The differential gear set in which a lubrication structure is improved of claim 10, wherein a gap between the inner planar bottom surface of the second groove and the lower end surface of the second pinion shaft become larger from the center portion of the lower portion of the second pinion shaft toward an edge of an exterior circumference direction thereof.

17. The differential gear set in which a lubrication structure is improved of claim 10, wherein the first pinion shaft, the second pinion shaft, the first pinion gear and the second pinion gear are aligned coaxially.

* * * * *